United States Patent [19]
Fraley

[11] Patent Number: 5,396,754
[45] Date of Patent: Mar. 14, 1995

[54] TRACTOR-MOUNTED ARTICULATED ARM AND TRIMMER ATTACHMENT

[75] Inventor: James P. Fraley, Patriot, Ohio
[73] Assignee: King Kutter, Inc., Winfield, Ala.
[21] Appl. No.: 100,673
[22] Filed: Aug. 2, 1993
[51] Int. Cl.⁶ ............................................. A01D 34/00
[52] U.S. Cl. ...................................... 56/15.2; 56/15.5
[58] Field of Search .............................. 56/14.7–15.2, 56/15.5, 17.1

[56] References Cited

U.S. PATENT DOCUMENTS

| | | | |
|---|---|---|---|
| 3,949,539 | 4/1976 | Cartner | 56/15.2 X |
| 4,502,269 | 3/1985 | Cartner | 56/15.5 X |
| 4,996,830 | 3/1991 | Davison | 56/15.2 X |
| 5,210,997 | 5/1993 | Mountcastle, Jr. | 56/15.2 |

*Primary Examiner*—Michael Powell Buiz
*Attorney, Agent, or Firm*—Joseph H. Beumer

[57] ABSTRACT

An articulated arm and cutter attachment for mounting on a tractor has a pair of elongated vertical booms pivotally connected to one another at their top ends. The lower end of one of the booms is pivotally connected to a beam extending laterally from underneath the tractor chassis. The other boom has a telescoping lower end on which is mounted a foot which supports a rotary cutter. An upper portion of the beam connected to the tractor is inclined outwardly, and an upper portion of the other beam is inclined inwardly to allow the arm to reach out a substantial distance and extend over obstacles such as fences. Pivoting mechanisms in the foot allow tilting of the supported cutter over a wide range of angular positions. Hydraulic cylinders are provided for carrying out movement of the arm, along with hydraulic fluid lines and controls. Yieldable mounting of the foot provides for breaking away of the cutter upon striking an obstacle.

19 Claims, 2 Drawing Sheets

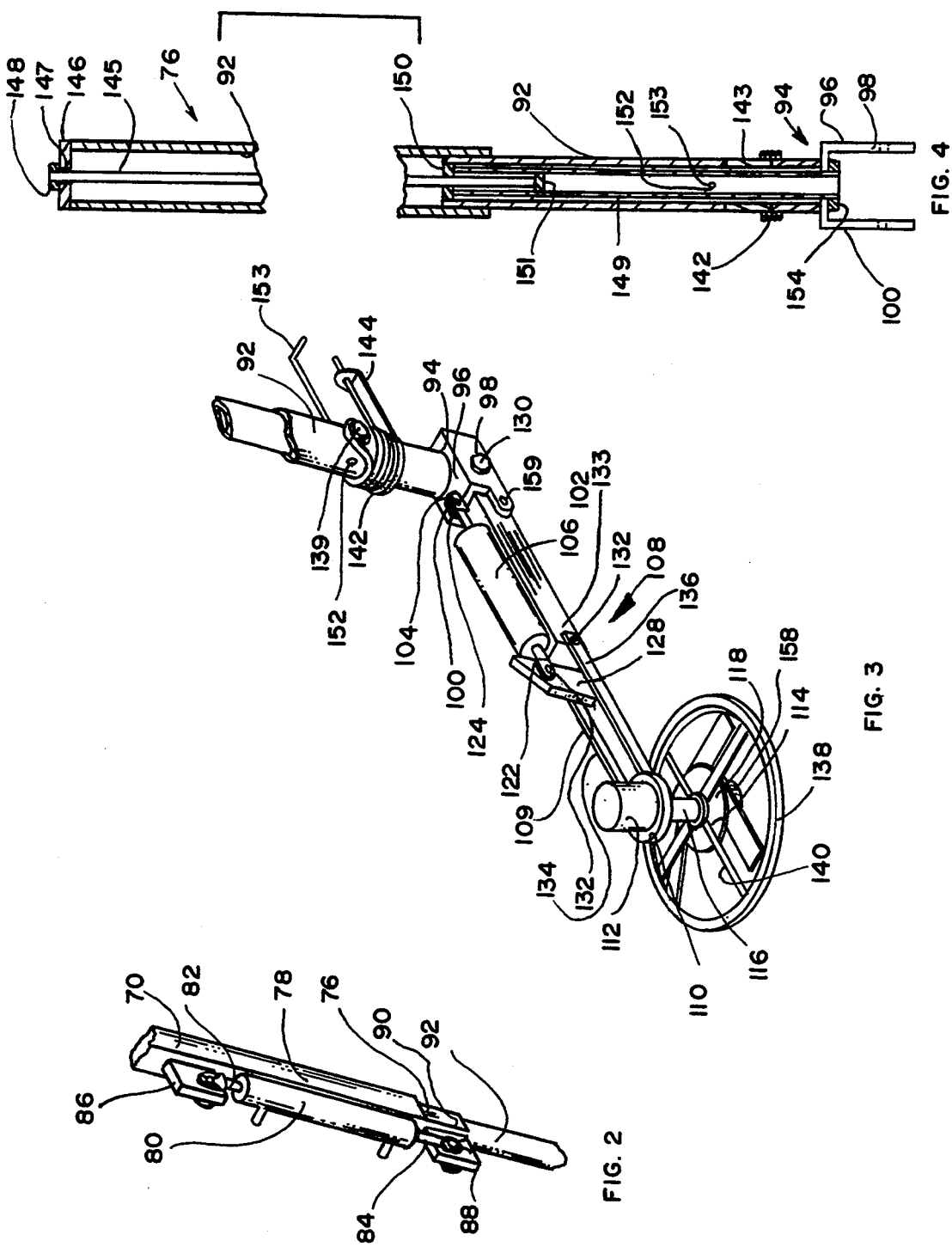

TRACTOR-MOUNTED ARTICULATED ARM AND TRIMMER ATTACHMENT

FIELD OF THE INVENTION

This invention relates to apparatus for mounting of cutting implements on tractors.

BACKGROUND OF THE INVENTION

Extension of the reach of tractor-mounted cutting equipment is needed to take fuller advantage of the mobility and built-in hydraulic power systems offered by tractors. In particular, a capability for reaching over fences, guard rails, and other obstacles would reduce requirements for use of hand-held equipment in the final step of many cutting jobs. Support of cutting devices for deployment in other rough spots such as in and around ditches and on slopes is also desired.

Various arrangements for mounting of mowers on tractors are shown in prior patents. U.S. Pat. No. 4,048,789, issued Sep. 20, 1977, to Cartner, discloses a tractor-mounted mower attachment using a hydraulically articulated linkage system enabling pivoting motion to carry out horizontal, vertical, and angular movement of the mower. Jolls, in U.S. Pat. No. 3,274,762, issued Sep. 27, 1966, discloses a mower-supporting arm adjustably mounted on a vertical bracket and articulated to provide for pivoting and telescoping movement as required for a desired location of the mower cutter bar. U.S. Pat. No. 4,956,965, issued Sep. 10, 1990, to Parsons, discloses a boom attachment pivotally connected to an upstanding support so as to allow a mower to be moved to a position on either side of the tractor. A boom supporting a mower for swinging around vertically and horizontally as well as for telescoping is shown in U.S. Pat. No. 3,949,539, issued Apr. 13, 1976, to Cartner. Mounting of a grass trimmer on an articulated arm carried by a special purpose vehicle is disclosed in U.S. Pat. No. 4,663,920, issued May 12, 1987, to Shovhoj, the arm in this patent being designed for hand manipulation of a parallelogram structure rather than for hydraulic operation. While the devices shown in these patents enable maneuvering of tractor-mounted mowers or trimmer units into desired cutting positions with respect to the ground, they do not provide for lifting the cutting device high enough to reach over and clear obstacles such as fences. In addition to extending over obstacles, into low spots and along slopes, the arm and attached cutter should allow for horizontal movement for a substantial distance to facilitate cutting a wide area, and it should cut a path along a fence on the side across from the tractor while tracking forward or rearward with the tractor.

SUMMARY OF THE INVENTION

The present invention is directed to an articulated arm and rotary cutter attachment for mounting on a conventional tractor. The arm comprises a pair of elongated, generally vertically disposed booms, each having a top end and a bottom end, with the top ends being pivotally connected to one another at a height above the level of the tractor. The inner of the two booms has a bottom end pivotally connected to a frame member affixed to the tractor and includes an upper portion disposed diagonally outward so that the top is spaced apart outwardly from the bottom pivot axis. The upper portion is integrally formed with a straight lower portion, movable within limits from a vertical position. The outer boom has an upper portion inclined inwardly from a straight, vertical lower portion so that the two upper portions form an inverted V-shape with respect to one another. A telescoping end member is provided at the lower end of the outer boom to enable longitudinal, up-and-down movement of a cutter connected to a foot located at the distal end of the boom. Pivoting mechanisms including pins located at the pivot axes and supported by yokes or the like are provided as required at each location where pivoting movement capability is indicated. The bottom end of the inner boom pivots around an axis defined by a pin disposed horizontally and supported by the frame member, and the upper ends of the booms also pivot with respect to one another around a pin providing a horizontal axis. The foot at the bottom of the outer boom has mechanisms for pivoting around two horizontal axes, allowing the supported rotary cutter to be tilted over a wide angular range. Actuators in the form of double-acting hydraulic cylinders with pistons and rods are connected to the pivoting members in each location as required to carry out the desired movement. Such a cylinder and piston assembly is also operatively connected to the telescoping boom end member to extend and retract it. A cutting device, which may comprise a conventional trimmer, is mounted on the outer end of the foot. Pressurized hydraulic supply lines and a control system as required for maneuvering the arms and operating the cutter are also included.

Attachments embodying the invention not only may be maneuvered so as to provide a predetermined elevation above the ground, giving a desired cutting height, but also they have a capability for reaching over fences, guard rails, and other substantially high obstacles. This spanning capability is obtained primarily by the combined effects of three mechanisms, each of which elevates the foot, that is, pivoting motion around the horizontal axes at each end of the inner boom and telescoping of the end of the outer boom. The articulated arm also may be maneuvered into position for cutting in low spots and on slopes, with the foot being tilted as needed to follow the contour of the ground. A break-away mechanism is also provided in the supporting structure, allowing the cutter to yield and avoid breakage when striking a fixed object.

It is, therefore, an object of this invention to provide an articulated arm attachable to a tractor and capable of supporting a cutting device in an extended position across obstacles such as fences.

Another object is to provide a hydraulically operated articulated arm and trimmer assembly extendable to operating positions across obstacles and in low spots or on slopes.

Yet another object is to provide such an arm and trimmer assembly with capability for moving a trimmer mounted on the distal end thereof vertically, horizontally, and angularly to desired cutting positions on rough terrain.

Still another object is to provide means for actuating and controlling the operation of such an assembly.

Other objects and advantages of the invention will be apparent from the following detailed description.

BRIEF DESCRIPTION OF THE DRAWINGS

FIG. 2 is a side elevational view, partly broken away, showing the telescoping mechanism of the outer boom of the articulated arm.

FIG. 3 is a side elevational view, partly broken away, showing a foot structure for supporting and pivoting the trimmer.

FIG. 4 is a sectional view of the vertically telescoping section of the outer boom.

DESCRIPTION OF THE PREFERRED EMBODIMENT

Figure 1:
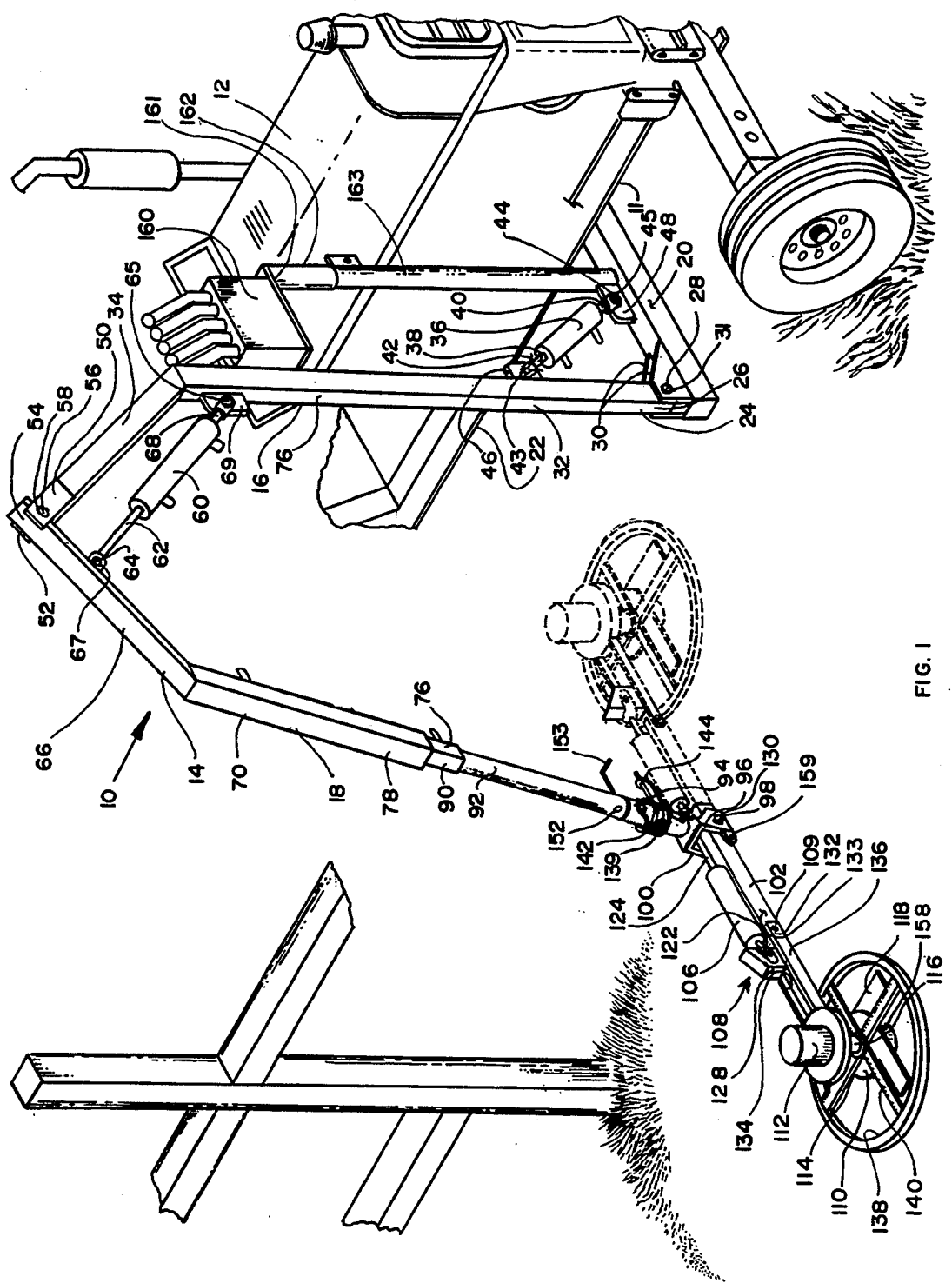
FIG. 1 is a perspective view showing an articulated arm and trimmer assembly mounted on a tractor.

Referring to FIG. 1 of the drawings, there is shown an articulated arm and trimmer assembly 10 mounted for operation on a chassis 11 of a conventional tractor 12. The arm 14 is made up of a pair of generally vertically disposed booms, an inner boom 16 and an outer boom 18 pivotally connected to one another at their top ends. A supporting beam 20 is connected to the underside of the tractor and extends outward horizontally from the tractor chassis a distance of two feet to allow movement of the arm and operation of a supported hydraulic cylinder without striking the tractor. The beam is secured to other elements of a platform 22 which may be welded together and bolted or otherwise attached to the tractor, with adaptor bars or the like being used as required. Square metal tubing may be used for the support beam as well as for the booms.

Proximate end 24 of the inner boom is provided with holes 26 receiving a horizontally extending pivot pin 28 supported between gusset plates 30 welded to beam 20, and having holes 31 to receive the pin. Inner boom 16 includes an elongated vertical lower portion 32 and integral therewith a diagonally inclined upper portion 34 extending outward to a location spaced outside of pivot pin 28. Movement of the top of inner boom 16 pivotally inward and outward around a first horizontal axis defined by pin 28 and away from the position shown is carried out by action of a hydraulic cylinder 36 having a piston and actuator rods 38, 40 pivotally connected to pins 42, 44. The pins are secured within hole 43 of lug 46 welded to lower portion 32 and hole 45 of lug 48 welded to beam 20. Operating characteristics of the cylinder and rods and their placement may be selected so as to provide for a desired amount of angular movement inward or outward away from a vertical position. Upper portion 34 of the inner boom is preferably inclined at an angle of 45 degrees with respect to lower portion 32 and may have a length of about one-half of the lower portion.

The top end of upper portion 34 of the inner boom has a forward plate 50 and a rearward plate 52 welded thereto and defining a yoke for receiving upper end 54 of outer boom 18. A pivot pin 56 extends horizontally through holes 58 in the plates, defining a second horizontal axis for pivotal movement of the booms with respect to one another. Hydraulic cylinder 60 has one rod 62 pivotally connected to lug 64 welded to upper portion 66 of the outside boom and a rod 68 pivotally connected to lug 69 welded to lower portion 32 of the inside boom near its juncture with the upper portion 34. Pins 65, 67 secure the rods in place for pivotal movement. This provides for controlled movement of the booms around the axis of pivot pin 56 and contributes to raising and lowering of the foot and attached trimmer.

Outer boom 18 has a vertical lower portion 70 integral with the inclined upper portion 66 and disposed at an angle of 45 degrees therewith. The lower portion 70 of the outer boom includes a telescoping section 76 which is slidably received within the tubing 78 above this section. Movement of section 76 up and down is effected by means of hydraulic cylinder 80 and rods 82 and 84 at its upper and lower ends, respectively, connected to lugs 86, 88 secured to tubing 78 and telescoping section 76. Movement over a vertical distance such as two feet or more may be obtained by this means.

Top portion 90 of telescoping section 76, which slides within square tubing 78, also has a square cross section over the part that reaches into the square tubing. Lower part 92 of the outer boom has a circular cross section to provide a round surface for receiving external torsion-spring coil 142 and internal circular members as discussed below, the top of the round part being welded to the bottom of the square portion. Bottom end 94 of the lower portion 92 has a horizontal end plate 96 and spaced-apart side plates 98, 100 defining a yoke for receiving foot support block 102 and a lug 104 for making connection with hydraulic cylinder 106.

Foot assembly 108, pivotally connected to the lower end of the outer boom, includes an elongated support block 102, a frame 109, a hydraulically operated trimmer 110 having a motor 112, hub 114, shaft 116 and blades 118, a hydraulic cylinder 106 with rods 122, 124, lugs 104, 128, and pivot pins 130 and 132. Support block 102 is connected to plates 98, 100 by means of pivot pin 130 extending horizontally through the plates and through the width of the block. Adjacent to the outer end 133 of the support block, a mounting frame 109 is connected to the support block 102 by means of pivot pin 132 passing through the block and through side bars 134, 136 of the frame. Lug 104 welded to the lower end of the outer boom above and adjacent to the yoke and lug 128 welded to the support frame are each connected to a rod 122, 124 of hydraulic cylinder 106, enabling tilting of the trimmer around the axis of pin 132. Motor 112 is operably connected to a downwardly extending shaft 116 journalled in the frame by means not shown. Hub 114, connected to the shaft, carries rotatable blades 118, which may take the form of flat strips of plastic such as nylon mounted perpendicular to the shaft and loosely connected so as to yield when striking a fixed obstruction. A circular guard 138 disposed radially outside of the blades is rigidly connected to the support frame by spokes 140 so as to deflect the foot away and prevent the blades from striking fixed obstructions such as fence posts.

As shown in FIG. 4, the lower part 92 of outer boom 18 is provided with a structure which enables the bottom end 94 thereof to undergo limited rotation around the axis of the boom so as to allow the foot to be rotated to a selected one of a plurality of circumferential locations and to give the foot a "break-away" movement capability upon striking a fixed obstacle.

Telescoping section 76 is made of square tubing which slides within an outer section of larger square tubing at the upper end of lower part 70 of the outer boom. An inner rod 145 is supported within and along the axis of section 76 by means of a plate 146 disposed across the upper end of the section and having an aperture 147 receiving the rod. The rod is connected to an annular collar 148 which supports the rod and other attached structure and bears against the plate in a manner such as to allow rotation of the rod.

Immediately below lug 88 the square tubing of section 76 terminates and round part 92 begins, the bottom of the square section being welded to the top of the round part. An inner round tube 149 begins immediately above the square-to-round transition and extends to the bottom of the boom. The inner tube is connected to rod 145 by means of a collar 150 welded to the rod and inner tube. This makes the inner tube rotatable with the rod, while the outer tube is kept in fixed position. Slightly below the square-to-round transition point, rod 145 terminates, with the rod end being connected by welding to collar 151, which in turn is welded to inner tube 149.

Bottom end 94 of the boom is separated from the outer tube of the upper end of round part 92 by a tubular spacer element 143 connected to inner tube 149. The spacer element turns with the rod and inner tube inside the fixed outer tube. Apertures 152 extending radially through the two tubes enable alignment of the inner and outer tubes at a selected one of a plurality of circumferential locations and locking of the foot in the selected position by insertion of a pin 153 through the aligned apertures. Preferably, the inner tube is provided with four apertures at increments of 90°. As shown in FIG. 1, the foot may be moved from an outer position shown in solid lines to an inner one in dotted lines.

Spacer element 143 is coupled to bottom end portion 94 through a coil spring 142 disposed circumferentially around the boom at the juncture of these two sections. The top end of the coil is connected to spacer 143 by bolt 139, and the bottom end thereof engages a linking member 144 secured to end portion 94. This allows limited rotation of the foot with respect to the boom upon striking a fixed obstacle, with the resulting shock being absorbed by the spring. The foot may spring back over an angle such as 90°, giving the operator time to stop the tractor. Bottom 94 is secured to end plate 96 by welding of the inner and outer tubes to a collar 154 at a juncture underneath the plate.

As shown in FIG. 3, the trimmer may be tilted by expanding or contracting the rods actuated by hydraulic cylinder 106, the trimmer frame as a result being pivoted around pin 132. Support block 102 may also be caused or allowed to pivot up or down around pin 130, with the trimmer seeking a level defined by a spacer bulb 158 located below the cutter blades and having a height corresponding to a desired ground clearance height. The support block may also be locked in a horizontal position by means of a pin inserted through aperture 159 inside plates 98, 100 and extending through a hole across the width of the block. Locking of the block in a tilted position upward or downward from horizontal may be provided for by including holes above and below the horizontal hole across the block, allowing insertion of the pin through a selected hole.

Control of movement of the various parts of the arm and foot assembly and operation of the cutter are realized by means of conventional hydraulic lines communicating with control box 160 having a control lever for movement of the actuator rods of each hydraulic cylinder and for turning the motor on and off. Each of the levers actuates valves (not shown) communicating with hydraulic fluid inlets and outlets as required. Control box 160 is secured to a horizontal plate 161 mounted on and at right angles to a pipe 162 which is received in a vertically extending holder 163 in a manner such as to allow the box to be swung around by the operator to a desired location.

Apparatus embodying the invention provides for reaching out over a significant distance with a cutter, the device shown being extendable outward to a cutting position at least 10 feet away from the tractor chassis.

The arm may be made principally of square tubing as shown, except for portions of the lower part of the outer boom for which round sections are needed. The square tubing may have a size of three inches across a side.

The form of the invention shown and described above is to be taken as a preferred embodiment of the same, and it is to be understood that changes and modifications in construction may be made without departing from the scope of the appended claims.

I claim:

1. A hydraulically actuated articulated arm and rotary cutter attachment for mounting on a tractor comprising:
    a pair of elongated upright booms, including an inner boom and an outer boom, each having an upper end and a lower end;
    support means adapted for being rigidly connected to said tractor and defining a first horizontal pivot axis spaced apart laterally from the tractor;
    said inner boom having a normally vertically extending lower section and integral therewith an upper section disposed diagonally outward at an acute angle with respect to the lower section, the lower end of said inner boom being connected to said support means in a manner such as to provide for limited pivotal movement of the inner boom around said first horizontal pivot axis;
    said outer boom having a normally vertically extending lower section and integral therewith an upper section disposed diagonally inward at an acute angle with respect to said lower section;
    said inner boom and said outer boom being connected to one another at their upper ends by means allowing limited pivotal motion with respect to one another around a second horizontal pivot axis;
    said lower section of said outer boom including a bottom portion slidably connected for telescoping upward and downward movement;
    a foot connected to said bottom portion of said outer boom;
    a rotary cutter and a hydraulic motor powering the cutter mounted on said foot;
    first, second, and third hydraulic cylinder and piston means disposed to provide pivotal motion of said booms around said horizontal axes and to provide slidable motion of the bottom portion of said outer boom;
    hydraulic supply lines communicating said cylinder means and said motor with a pressurized hydraulic fluid source; and
    hydraulic fluid control means.

2. The articulated arm and cutter attachment as defined in claim 1 wherein said foot comprises an elongated block pivotally secured to said bottom portion of said outer boom, said block having an outer end defining a third horizontal pivot axis.

3. The articulated arm and cutter attachment defined in claim 2 including a frame carrying said rotary cutter and motor and having an inner end pivotally connected to said block for movement around said third horizontal axis and fourth hydraulic cylinder and piston means operably connected to said frame and said bottom portion of said outer boom to effect tilting movement of said cutter.

4. The articulated arm and cutter attachment as defined in claim 1 wherein each said hydraulic cylinder and piston means includes a pair of actuator rods, with an outer end of each said rod operably secured to a lug on a member adjacent to a said pivot axis.

5. The articulated arm and cutter attachment as defined in claim 2 wherein said foot is connected to said bottom portion of said outer boom by yieldable support means, whereby said foot may undergo limited circumferential movement with respect to said outer boom upon striking a fixed object.

6. The articulated arm and cutter attachment as defined in claim 5 wherein said yieldable support means comprises a spacer segment of said bottom portion having a circular cross section, a sleeve secured to said foot and disposed for movement around an axis defined by said spacer segment, and a coil spring having a first end connected to said spacer segment and a second end connected to said sleeve.

7. The articulated arm and cutter assembly as defined in claim 6 including means in said lower section of said outer boom for disposing said foot in a plurality of selected circumferential positions around a longitudinal axis and means for securing said foot in a selected position.

8. The articulated arm and cutter assembly as defined in claim 7 wherein said lower section includes a first circumferentially fixed portion having a circular cross section and a second, circumferentially movable portion having a circular cross section and matable with said first portion, apertures in said portions defining a plurality of paths extending through both said portions and pin means engaging said portions along a selected one of said paths.

9. A hydraulically actuated, articulated arm and rotary cutter attachment mountable on a chassis of a tractor comprising:

support frame means rigidly connectable to said chassis and including a bracket defining a first horizontal pivot axis spaced apart laterally from said chassis and parallel to a longitudinal axis defined by said chassis;

a pair of upright booms including an inner boom and an outer boom, each said boom having an upper end and a lower end, an elongated lower section adapted to be placed in a vertical position and an upper section disposed diagonally with respect to the lower section thereof, the inner boom adapted for placement with said upper section extending outward and the outer boom adapted for placement with said upper section extending inward;

said lower end of said inner boom being pivotally connected to said support means whereby said inner boom may be moved toward and away from said chassis by pivoting around said first horizontal axis;

the upper ends of said booms being pivotally connected to one another by means defining a second horizontal pivot axis around which said booms may be moved together and apart;

means for extending and retracting said lower end of said outer boom upward and downward with respect to the upper end thereof;

a foot secured to said lower end of the outer boom;

a rotary cutter and a hydraulic motor powering the same carried by said foot;

hydraulic cylinder and piston means arranged to provide pivotal movement around said pivot axes of boom members adjacent to said axes and to provide extension and retraction of said lower end of said outer boom;

hydraulic fluid supply lines communicating said cylinder means and said motor with a pressurized hydraulic fluid source; and hydraulic fluid control means.

10. The arm and cutter attachment defined in claim 9 wherein said foot includes an elongated block having an inner end disposed generally perpendicular to and connected to said lower end of the outer boom and an outer end having defined therein a third horizontal pivot axis and a frame member supporting said cutter in position for being tilted around said third axis.

11. The arm and cutter attachment as defined in claim 10 including yieldable means carried by said lower end of said outer boom whereby said foot may be deflected circumferentially upon striking a fixed obstacle.

12. The arm and cutter attachment as defined in claim 9 including a first hydraulic cylinder and piston having a rod at one end thereof pivotally connected to a lug fixedly secured to said support frame means and a rod at the opposite end thereof pivotally secured to a lug secured to the lower section of said inner boom.

13. The arm and cutter attachment as defined in claim 12 including a second hydraulic cylinder and piston having a rod at one end thereof pivotally connected to the lower section of said inner boom and a rod at the opposite end thereof pivotally connected to the upper section of said outer boom.

14. The arm and cutter attachment as defined in claim 13 including a third hydraulic cylinder and piston having a rod at one end thereof connected to a lug secured to the lower section of said outer boom at a location near the juncture thereof with said upper section and a rod at an opposite end thereof connected to a lug secured to a slidable portion of said lower section.

15. The arm and cutter attachment as defined in claim 11 wherein said yieldable means comprises a coil spring having one end thereof secured to first, a circumferentially fixed portion of said lower section of said outer boom and the opposite end of said coil spring secured to a second portion arranged to be rotatable with respect to said first portion.

16. The arm and cutter attachment as defined in claim 9 wherein said support frame means comprises a beam secured to a platform underneath said chassis and extending outward perpendicular to said longitudinal axis.

17. The arm and cutter attachment as defined in claim 9 wherein said lower end of said outer boom comprises a vertically slidable bottom portion including an outer tube in fixed circumferential position, an inner tube disposed concentrically within said outer tube, and a rod disposed concentrically within said inner tube and secured thereto, said rod being supported to allow rotation, but not axial movement, with respect to said outer tube.

18. The arm and cutter attachment as defined in claim 17 including a plate disposed across said outer tube for supporting said rod, said plate having an aperture penetrated by said rod, and a collar secured to said rod above said plate and having a bottom surface adapted to make contact with said plate upon being rotated.

19. The arm and cutter attachment as defined in claim 18 wherein said elongated lower section of said outer boom includes a tube having a square cross section and adapted to receive therein an upper part of said outer tube, said upper part having a square cross section.

* * * * *